United States Patent
Maeda et al.

(10) Patent No.: US 9,204,007 B2
(45) Date of Patent: Dec. 1, 2015

(54) IMAGE READING DEVICE STABILIZING QUALITIES OF READ IMAGES

(71) Applicants: Takashi Maeda, Nagoya (JP); Yuki Nakajima, Ogaki (JP)

(72) Inventors: Takashi Maeda, Nagoya (JP); Yuki Nakajima, Ogaki (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 11 days.

(21) Appl. No.: 13/795,812

(22) Filed: Mar. 12, 2013

(65) Prior Publication Data

US 2013/0258425 A1 Oct. 3, 2013

(30) Foreign Application Priority Data

Mar. 30, 2012 (JP) ................ 2012-079790

(51) Int. Cl.
| | |
|---|---|
| *H04N 1/04* | (2006.01) |
| *H04N 1/028* | (2006.01) |
| *H04N 1/40* | (2006.01) |
| *H04N 1/00* | (2006.01) |
| *H04N 1/12* | (2006.01) |
| *H04N 1/193* | (2006.01) |
| *H04N 1/203* | (2006.01) |

(52) U.S. Cl.
CPC ....... *H04N 1/02815* (2013.01); *H04N 1/00657* (2013.01); *H04N 1/40056* (2013.01); *H04N 1/00588* (2013.01); *H04N 1/12* (2013.01); *H04N 1/193* (2013.01); *H04N 1/2032* (2013.01)

(58) Field of Classification Search
CPC .......... H04N 1/02815; H04N 1/00588; H04N 1/00657; H04N 1/12; H04N 1/193; H04N 1/2032; H04N 1/40056
USPC ............... 358/3.26, 463, 488, 475, 474
See application file for complete search history.

(56) References Cited

U.S. PATENT DOCUMENTS

| | | | |
|---|---|---|---|
| 7,420,711 B2 * | 9/2008 | Okawa | 358/3.26 |
| 7,880,933 B2 * | 2/2011 | Okawa | 358/3.26 |
| 2002/0048053 A1 | 4/2002 | Imai | |

FOREIGN PATENT DOCUMENTS

| | | |
|---|---|---|
| JP | 2002-135530 A | 5/2002 |
| JP | 2003-333327 A | 11/2003 |

(Continued)

OTHER PUBLICATIONS

Japanese Office Action dated Aug. 12, 2014 received in related application JP 2012-079790 together with an English language translation.

*Primary Examiner* — Housang Safaipour
(74) *Attorney, Agent, or Firm* — Scully, Scott, Murphy & Presser, P.C.

(57) ABSTRACT

An image reading device includes a conveying unit, reading unit, and a control unit. The conveying unit conveys successive two sheets along a conveying path such that a gap is formed between the successive two sheets. The reading unit reads a sheet conveyed at a reading position in the conveying path. The reading unit has a light source and light-receiving unit. The control unit controls the light source to emit light at a first light intensity for a sheet that has reached the reading position. The light-receiving unit receives light reflected by the sheet present at the reading position. The control unit further controls the light source to emit a light at a second light intensity lower than the first light intensity during a period of time from when the reading unit has been read the preceding sheet to when the reading unit begins reading the subsequent sheet.

6 Claims, 8 Drawing Sheets

(56) References Cited

FOREIGN PATENT DOCUMENTS

| | | |
|---|---|---|
| JP | 2004-254340 A | 9/2004 |
| JP | 2005-110172 A | 4/2005 |
| JP | 2007-195009 A | 8/2007 |
| JP | 2010-283438 A | 12/2010 |

* cited by examiner

IMAGE READING DEVICE STABILIZING QUALITIES OF READ IMAGES

CROSS REFERENCE TO RELATED APPLICATION

This application claims priority from Japanese Patent Application No. 2012-079790 filed Mar. 30, 2012. The entire content of the priority application is incorporated herein by reference.

TECHNICAL FIELD

The present invention relates to an image reading device.

BACKGROUND

Image-reading devices for reading images of sheets of original commonly use light sources to reflect light off the sheets. When reading a plurality of sheets of original fed sequentially with a gap formed between the trailing edge of each sheet and the leading edge of the next sheet, some conventional image-reading devices are configured to control the intensity of light emitted from the light sources during an inter-sheet period. The inter-sheet period is an interval in which the device is not reading a sheet of original that occurs between reading periods for reading successively fed the sheets. One conventional image-reading device continues to illuminate a light source during the inter-sheet period at the same intensity used during a reading period, while another conventional image-reading device extinguishes the light source during the inter-sheet period.

SUMMARY

However, both of the conventional devices described above have their shortcomings. For example, the temperature of the light source will rise if the light source is left on during inter-sheet periods at the same light intensity used during reading periods. The intensity of the light source decreases as its temperature rises despite the application of a constant current or voltage, adversely affecting the quality of the scanned image. On the other hand, if the light source is turned off during the inter-sheet period and relit for the next reading period, the intensity of light emitted from the light source does not stabilize immediately. If the next sheet is read before the light intensity stabilizes, the quality of the scanned image will suffer.

In view of the foregoing, it is an object of the invention to provide an image-reading device capable of maintaining the quality of a scanned image while reading images sequentially from a plurality of sheets of original.

In order to attain the above and other objects, the invention provides an image reading device includes a conveying unit, a reading unit, and a control unit. The conveying unit is configured to sequentially convey a plurality of sheets along a conveying path such that a gap is formed between successive two sheets of the plurality of sheets, the conveying path having a first reading position. The successive two sheets include a preceding sheet and a subsequent sheet. The reading unit is configured to read a sheet conveyed by the conveying unit at the first reading position. The reading unit includes a light source configured to emit a light toward the first reading position; and a light-receiving unit configured to receive a reflected light emitted by the light source and reflected from the first reading position. The control unit is configured to: control the light source to emit a light at a first light intensity for a sheet that has reached the first reading position, the light-receiving unit receiving a reflected light that is reflected by the sheet present at the first reading position; control the light source to emit a light at a second light intensity lower than the first light intensity during a period of time from when the reading unit has been read the preceding sheet to when the reading unit begins reading the subsequent sheet.

BRIEF DESCRIPTION OF THE DRAWINGS

The particular features and advantages of the invention as well as other objects will become apparent from the following description taken in connection with the accompanying drawings, in which.

DETAILED DESCRIPTION

Figure 1:
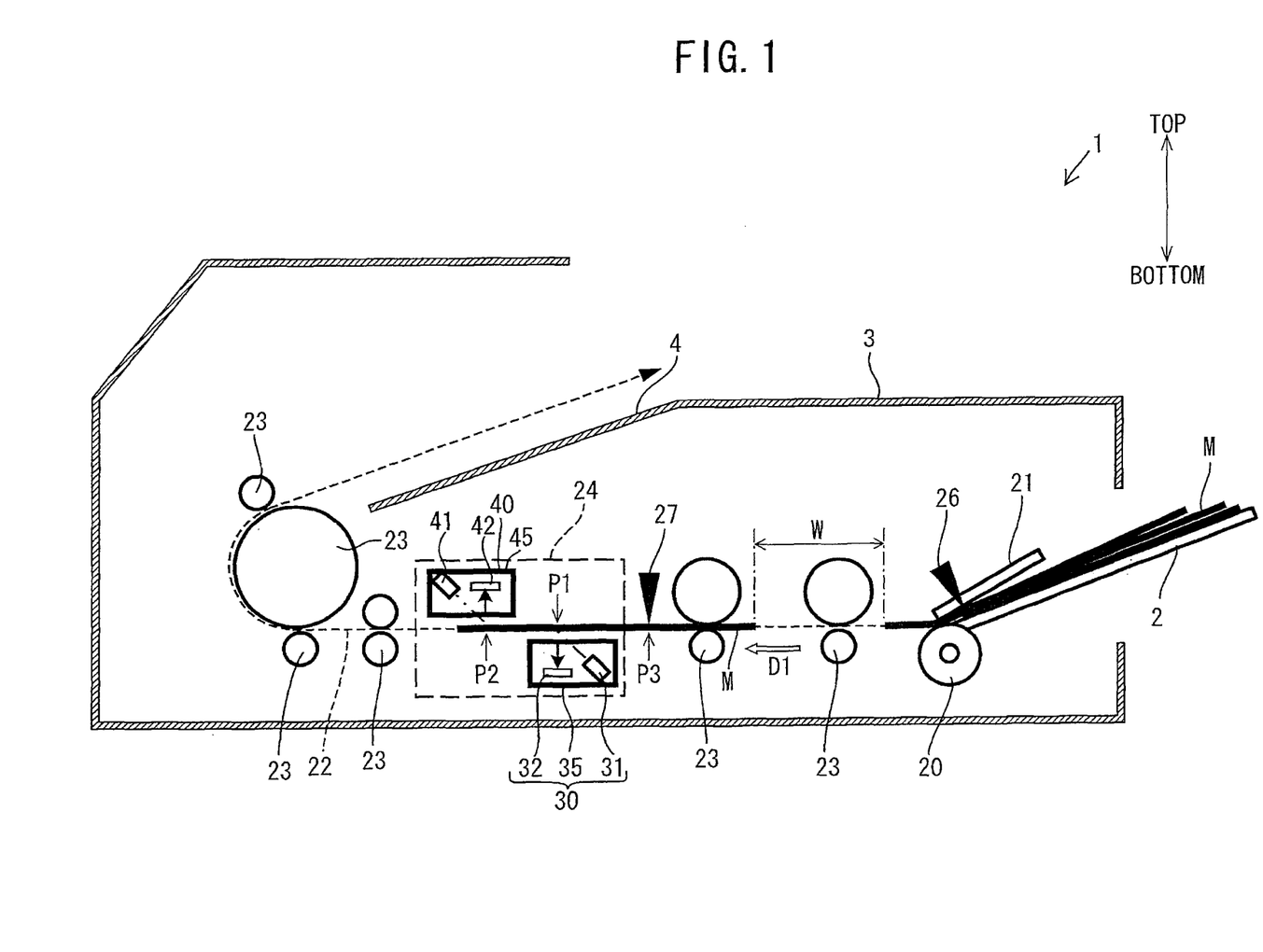
FIG. 1 is a cross-sectional side view of an image reading device according to a first through fourth embodiments of the invention.

Next, a first embodiment of the present invention will be described with reference to FIGS. 1 through 5. As shown in FIG. 1, an image-reading device 1 is a sheetfed scanner and includes a main casing 3, a first tray 2, a second tray 4, a conveying path 22, a plurality of conveying rollers 23, and a reading unit 24. The first tray 2 is capable of holding a plurality of sheets of original M. The second tray 4 is configured to receive the sheet M after a reading operation. The conveying path 22 leads from the first tray 2 to the second tray 4. The plurality of conveying rollers 23 is disposed along the conveying path 22 for sequentially conveying sheets of original M from the first tray 2 to the second tray 4 with a gap W formed between two sequentially fed sheets. The reading unit 24 is configured to read each sheet M as the sheet M is conveyed along the conveying path 22. In the following description, the direction from the first tray 2 to the second tray 4 along the conveying path 22 will be called a conveying direction D1.

The internal components of the image-reading device 1 are housed in the main casing 3. In addition to the conveying rollers 23, other components disposed in the main casing 3 along the first tray 2 include a feeding roller 20, a separating pad 21, the reading unit 24, a front sensor 26, and a rear sensor 27.

The feeding roller 20 contacts the sheet M placed on the first tray 2. When the feeding roller 20 rotates, the friction generated between the feeding roller 20 and the sheet M set in the first tray 2 pulls the sheets M into the main casing 3. The frictional force applied to the sheets M by the separating pad 21 separates the sheets M so that they are conveyed one at a time along the conveying path 22.

The reading unit 24 includes a first reading unit 30 and a second reading unit 40 that respectively read opposite sides of the sheet M conveyed along the conveying path 22. The first reading unit 30 reads the surface of the sheet M facing downward in FIG. 1 at a first reading position P1. The second reading unit 40 reads the surface of the sheet M facing upward in FIG. 1 at a second reading position P2 downstream of the first reading position P1 in the conveying direction D1. In the following description, the surface of the sheet M facing downward in FIG. 1 when the sheet M is resting on the first tray 2 will be called the front surface, while the surface facing upward will be called the back surface.

Figure 3:
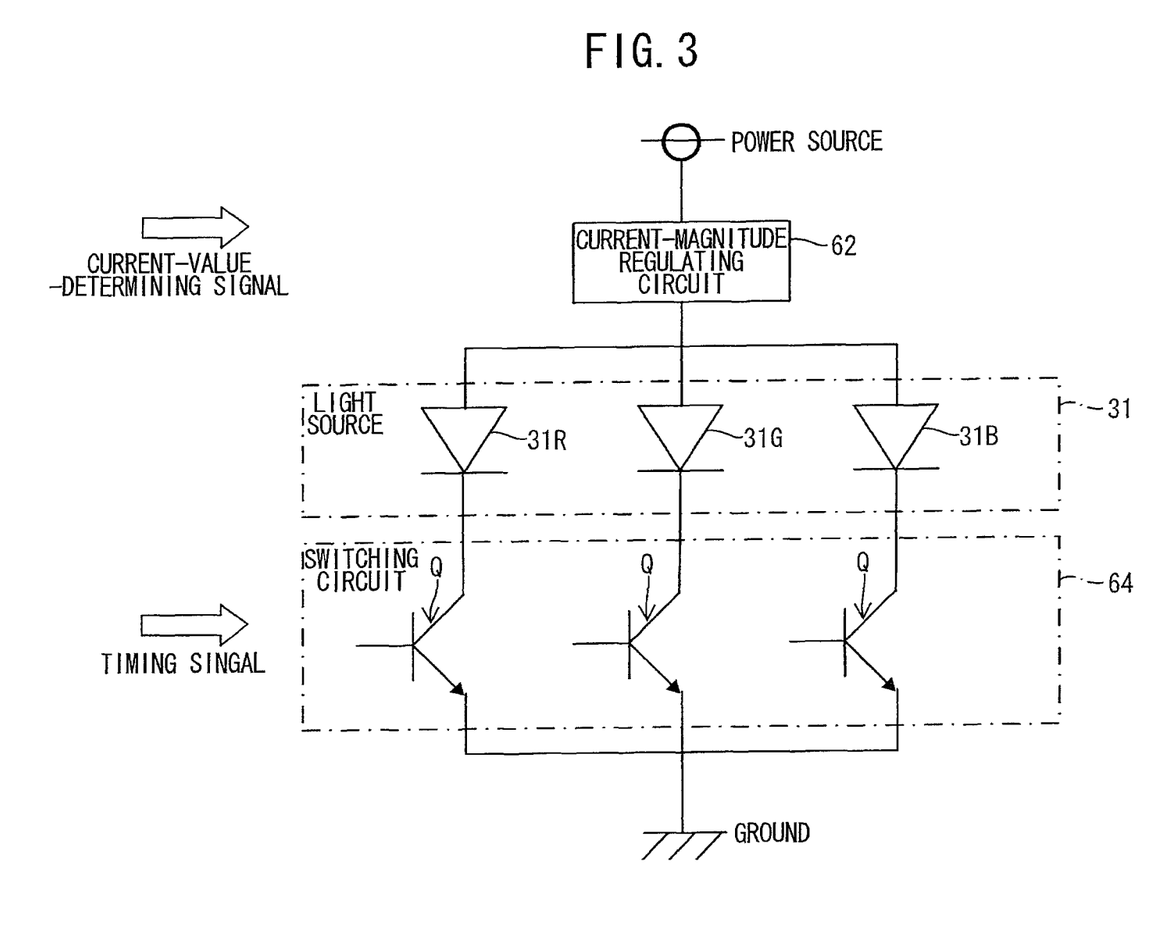
FIG. 3 is a circuit diagram of a current-regulating circuit and light sources of reading unit included in the image reading device shown in FIG. 1.

The first reading unit 30 has a light source 31, a light-receiving unit 32, and a carriage 35. The light source 31 and light-receiving unit 32 are mounted in the carriage 35. The light source 31 includes LEDs that emit light toward the first reading position P1 on the conveying path 22. More specifically, as shown in FIG. 3, the light source 31 includes red LEDs 31R that emit red light, green LEDs 31G that emit green light, and blue LEDs 31B that emit blue light.

The light-receiving unit 32 includes light-receiving elements for receiving reflected light that is emitted from the light source 31 and reflected by the front surface of the sheet M conveyed through the first reading position P1. The red LEDs 31R, green LEDs 31G, and blue LEDs 31B and each set of corresponding light-receiving elements are arranged linearly in the first reading unit 30 along a main scanning direction, which is orthogonal to the surface of the paper depicting FIG. 1. The first reading unit 30 reads the sheet M in the main scanning direction as the sheet M is conveyed in the conveying direction D1. The second reading unit 40 has essentially the same structure as the first reading unit 30, i.e., a light source 41, a light-receiving unit 42, and a carriage 45. Therefore, a description of the second reading unit 40 will not be included here.

The front sensor 26 is disposed on the first tray 2. The front sensor 26 is ON when the sheet M is present in the first tray 2 and OFF when the sheet M is not present in the first tray 2. The rear sensor 27 is disposed on the conveying path 22 upstream of the reading unit 24. The rear sensor 27 is ON when a sheet M is passing through a detection position P3 on the conveying path 22 upstream of the first reading position P1 and is OFF when the sheet M is not present at the detection position P3.

Figure 2:
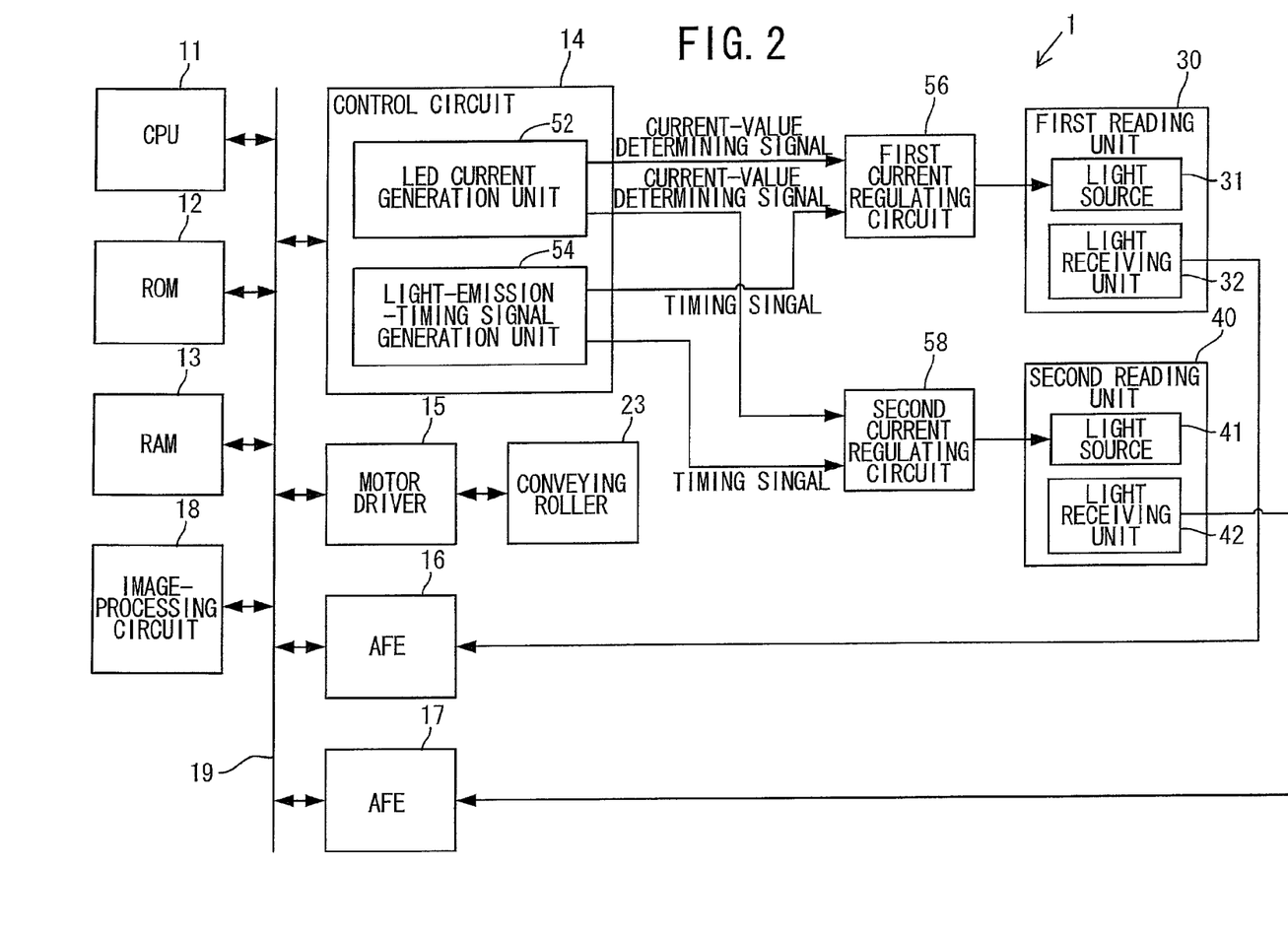
FIG. 2 is a block diagram showing the image reading device according to the first through fourth embodiments of the present invention.

As shown in FIG. 2, the image-reading device 1 also includes a CPU 11, a ROM 12, a RAM 13, a control circuit 14, first and second current regulating circuits 56 and 58, a motor driver 15, analog front-ends (AFE) 16 and 17, and an image-processing circuit 18. The CPU 11, ROM 12, RAM 13, control circuit 14, motor driver 15, AFEs 16 and 17, and image-processing circuit 18 are interconnected via a bus 19.

The ROM 12 stores various programs used for controlling operations of the image-reading device 1. The CPU 11 controls each component of the image-reading device 1 based on the programs read from the ROM 12.

The motor driver 15 is connected to a motor (not shown) and transmits a pulse signal to the motor based on commands from the CPU 11. Each pulse of the pulse signal drives the motor to rotate an angle equivalent to one step. When the motor is driven one step worth, the conveying rollers 23 is driven by the motor to convey sheet M a prescribed distance along the conveying path 22. Hence, to convey a sheet M, the CPU 11 controls the motor driver 15 to transmit a pulse signal to the motor, causing the conveying rollers 23 to convey the sheet M a distance equivalent to the prescribed conveying distance times the number of pulses in the pulse signal. Hereafter, the number of pulses in the pulse signal transmitted by the motor driver 15 to the motor will be called the step number.

The control circuit 14 includes an LED current generation unit 52, and a light-emission-timing signal generation unit 54. The generation units 52 and 54 are each connected to the current regulating circuits 56 and 58. The generation units 52 and 54 transmit signals to the current regulating circuits 56 and 58 for controlling the intensity of light emitted by the light sources 31 and 41 based on commands from the CPU 11. More specifically, the LED current generation unit 52 transmits a current-value-determining signal to the current regulating circuits 56 and 58 based on commands from the CPU 11, while the light-emission-timing signal generation unit 54 transmits timing signals to the current regulating circuits 56 and 58 based on commands from the CPU 11.

The current regulating circuit 56 is connected to the light source 31 of the first reading unit 30. As shown in FIG. 3, the current regulating circuit 56 includes a current-magnitude regulating circuit 62, and a switching circuit 64. The current-magnitude regulating circuit 62, light source 31, and switching circuit 64 are connected in series in the order given between a power source and ground.

The current-magnitude regulating circuit 62 receives the current-value-determining signal from the LED current generation unit 52 and adjusts the magnitude of current flowing through each LED in the light source 31 to the current value specified by the current-value-determining signal. By regulating the current flowing to each LED, the current-magnitude regulating circuit 62 can control the intensity of light emitted from the light source 31 when the light source 31 is on.

The switching circuit 64 includes a plurality of switching elements Q that are connected in series with each corresponding LED of the light source 31. The switching circuit 64 switches each of the switching elements Q on or off based on a timing signal transmitted from the light-emission-timing signal generation unit 54. By switching the LEDs to ON or OFF states in this way, the switching circuit 64 can adjust the lighting period of the light source 31.

Hence, the control circuit 14 controls the lighting period of the light source 31 and the intensity of light emitted during the lighting period based on the current-value-determining signal and the timing signal. The light-receiving unit 32 receives reflected light that is emitted from the light source 31 controlled by the control circuit 14 and reflected off the sheet M conveyed along the conveying path 22, and outputs a reading voltage, which is an analog signal based on the intensity of received light, to the AFE 16.

The AFE 16 is connected to the light-receiving unit 32 of the first reading unit 30. The AFE 16 has an analog-to-digital (AD) converter circuit that converts the reading voltage outputted from the light-receiving unit 32 to a gradation value represented by a digital signal. The AFE 16 converts the analog reading voltage received from the light-receiving unit 32 to a digital gradation value based on commands from the CPU 11 and stores this gradation value in the RAM 13. In this way, the image-reading device 1 can read the front surface of the sheet M.

The image-processing circuit 18 performs skew correction and other correction processes on the gradation values stored in the RAM 13. The operations performed by the current regulating circuit 58 to regulate light intensity in the light source 41 of the second reading unit 40 and the operations performed in the AFE 17 to read the back surface of the sheet M are essentially identical to the respective processes performed by the current regulating circuit 56 and AFE 16 described above for the light source 31 of the first reading unit 30. Therefore, a description of these processes will not be repeated.

Next, a lighting control process for the light sources performed when the reading unit 24 reads the sheet M will be described with reference to FIGS. 4 and 5. Here, the lighting control process will be described for the light source 31 when the first reading unit 30 is reading the front surface of the sheet M.

Figure 4:
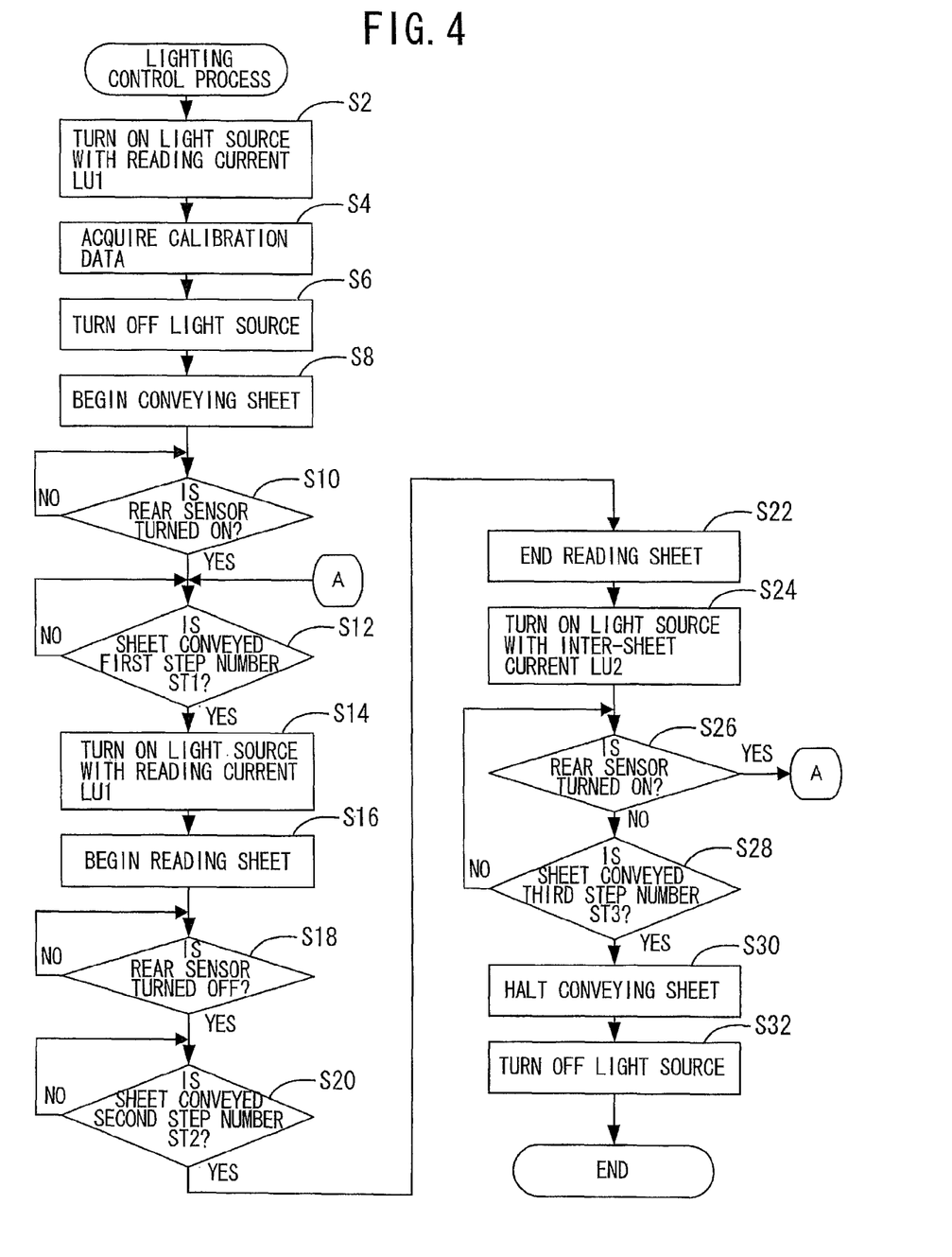
FIG. 4 is a flowchart illustrating steps in a lighting control process executed by the image reading device according to the first embodiment.

FIG. 4 is a flowchart illustrating steps in the lighting control process executed by the CPU 11 based on a prescribed program. FIG. 5 is a timing chart showing changes in the magnitude of electric current flowing to the light source 31 of the first reading unit 30 during the lighting control process. The CPU 11 begins this process upon receiving a read command inputted by the user to read the front surface of the sheet M and after confirming that an sheet M is present in the first tray 2 based on a signal received from the front sensor 26.

At the beginning of the lighting control process, the CPU 11 executes a calibration process for the first reading unit 30. In S2 of the calibration process, the CPU 11 commands the control circuit 14 to turn on the light source 31 with a reading current LU1 (timing t1 in FIG. 5). The reading current LU1 produces a light intensity in the light source 31 appropriate for reading the sheet M. In S4 the CPU 11 acquires calibration data required for regulating the light source 31 of the first reading unit 30.

A white reference plate (not shown) is disposed along the conveying path 22 opposite the first reading unit 30. Hence, by lighting the light source 31 at the reading current LU1 so that the light-receiving unit 32 receives light reflected off the white reference plate, the CPU 11 can acquire white reference data as a gradation value. Thus, in S4 the CPU 11 acquires this gradation value as the calibration data.

After acquiring the calibration data, in S6 the CPU 11 turns off the light source 31 (timing t2 in FIG. 5), ending the calibration process. In S8 the CPU 11 commands the motor driver 15 to begin rotating the conveying rollers 23. After the conveying rollers 23 begin conveying a sheet M, the CPU 11 waits until the sheet M is conveyed to the detection position P3. During this time, the CPU 11 monitors the rear sensor 27 and continues to wait while the rear sensor 27 remains off (S10: NO).

When the rear sensor 27 turns on (S10: YES), indicating that the leading edge of the sheet M in the conveying direction D1 has arrived at the detection position P3, the CPU 11 continues to convey the sheet M an additional first step number ST1. That is, the CPU 11 determines whether the sheet M has been conveyed an additional first step number ST1 from the point that the leading edge of the sheet M was detected by the rear sensor 27, and continues to wait while the sheet M has not been conveyed the additional first step number ST1 (S12: NO).

The first step number ST1 is set to a value corresponding to the distance that the sheet M must move in the conveying direction D1 after the leading edge of the sheet M has arrived at the detection position P3 in order for the leading edge to reach the first reading position P1. Therefore, once the CPU 11 has conveyed the sheet M the additional first step number ST1 (S12: YES), the leading edge of the sheet M has arrived at the first reading position P1.

After the leading edge of the sheet M has arrived at the first reading position P1, the CPU 11 begins the reading process. The first reading position P1 serves as a reference position for determining the start of the reading process. In S14 at the beginning of the reading process, the CPU 11 turns the light source 31 on at the reading current LU1 (timing t3 in FIG. 5) and in S16 begins reading the sheet M. In the reading process, the CPU 11 controls the light sources 31 to emit lights at the reading current LU1 (first light intensity) and the light-receiving units 32 receives the respective reflected light each being reflected by the sheet M at the first reading position P1.

In S18 the CPU 11 monitors the rear sensor 27 to determine whether the trailing edge of the sheet M in the conveying direction D1 has passed the detection position P3 and continues to read the sheet M while the rear sensor 27 remains on (S18: NO). When the rear sensor 27 turns off (S18: YES), confirming that the sheet M has passed the detection position P3, the CPU 11 continues to convey the sheet M while determining in S20 whether the sheet M has been conveyed an additional second step number ST2. While the sheet M has not been conveyed the additional second step number ST2 (S20: NO), the CPU 11 continues to read the sheet M. Once the sheet M has been conveyed the additional second step number ST2 (S20: YES), the CPU 11 ends the reading process.

The second step number ST2 is set to a value corresponding to the distance that the sheet M must move in the conveying direction D1 after the trailing edge of the sheet M has reached the detection position P3 in order for the trailing edge to reach the first reading position P1. After the sheet M passes the detection position P3, the CPU 11 continues reading the sheet M until the sheet M is conveyed the second step number ST2.

After ending the reading process, the CPU 11 executes a waiting process in S22 and S24. In S22 the CPU 11 halts reading of the sheet M and in S24 begins lighting the light source 31 with an inter-sheet current LU2, which is smaller than the reading current LU1 (timing t4 in FIG. 5). More specifically, the CPU 11 commands the control circuit 14 to change the current-value-determining signal outputted from the LED current generation unit 52 to a current-value-determining signal specifying a smaller current value than the reading current LU1 while maintaining the timing signal outputted from the light-emission-timing signal generation unit 54 to a signal for keeping the switching elements Q in the switching circuit 64 on. In other words, the CPU 11 controls the light source 31 to emit a light at the inter-sheet current LU2 (second light intensity) lower than the reading current LU1 in the waiting process.

After decreasing the current supplied to the light source 31, in S24 the CPU 11 waits until a subsequent sheet M is conveyed to the detection position P3 while monitoring the rear sensor 27. The CPU 11 continues to wait while the rear sensor 27 remains off (S26: NO). In other words, the CPU 11 waits for the next sheet M to be conveyed to the detection position P3 while conveying the just-read sheet M an additional third step number ST3. The third step number ST3 is set to a value corresponding to the distance that a sheet M must move in the conveying direction D1 for the leading edge of the sheet M to move from the position corresponding to the front sensor 26 to the detection position P3 of the rear sensor 27.

Figure 5:
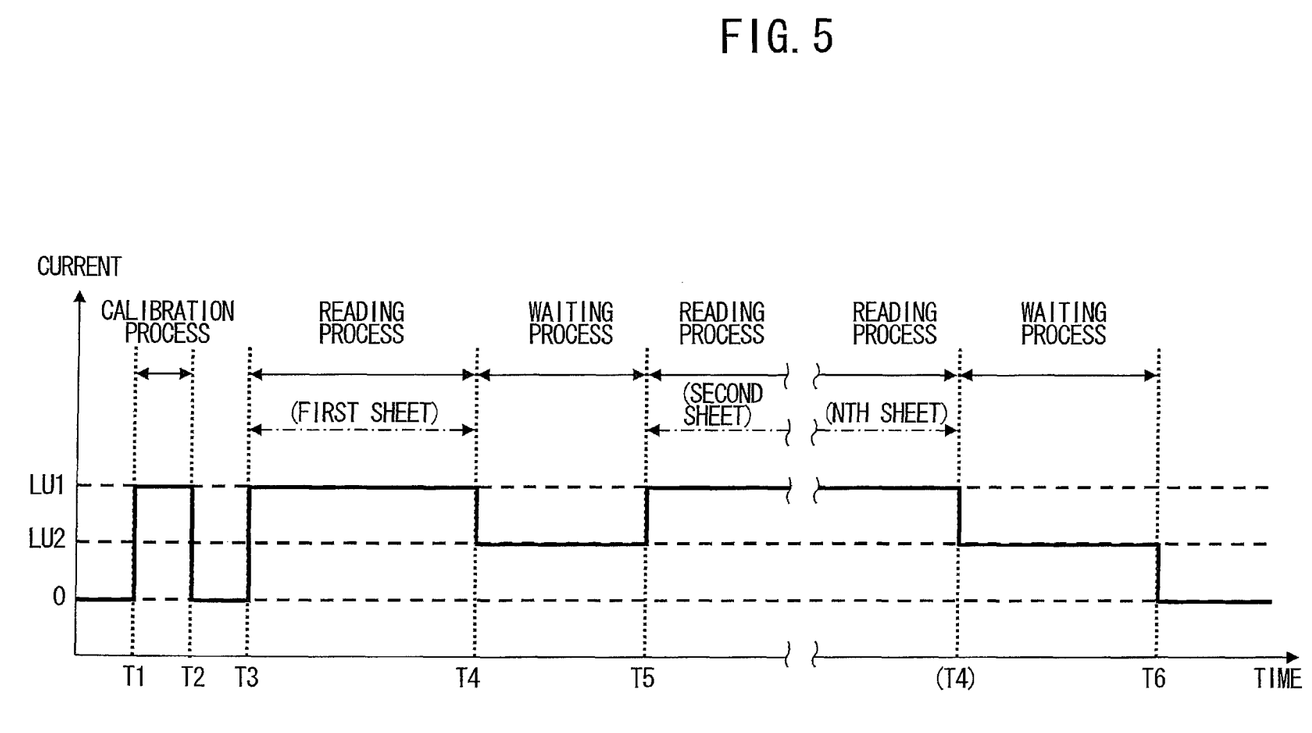
FIG. 5 is a timing chart showing changes in magnitude of electric current flowing to the light source during the lighting control process in the first embodiment.

If the CPU 11 detects that the rear sensor 27 has turned on, indicating that the leading edge of the next sheet M has been conveyed to the detection position P3 before the just-read sheet, such as the first sheet shown in FIG. 5, has been conveyed the additional third step number ST3 (S26: YES, S28: NO), then the CPU 11 returns to S12 and repeats the process described above for the next sheet M. When the next sheet M has been conveyed in the conveying direction D1 until its leading edge arrives at the first reading position P1, the CPU 11 halts the waiting process (timing t5 in FIG. 5) and once again executes the reading process.

On the other hand, if the CPU 11 determines that the just-read sheet, such as the Nth sheet M shown in FIG. 5, has been conveyed the third step number ST3 while the rear sensor 27 remains off, i.e., while a subsequent sheet M has not been conveyed (S26: NO, S28: YES), the CPU 11 ends the waiting process. In S30 the CPU 11 controls the motor driver 15 to halt conveyance of the sheet M, in S32 turns off the light source 31 (timing t6 in FIG. 5), and subsequently ends the lighting control process.

Effects of the First Embodiment (1) In the waiting process according to the first embodiment described above, the image-reading device 1 turns on the light source 31 of the first reading unit 30 with the inter-sheet current LU2, which is lower than the reading current LU1. By setting the current value of the light source 31 to a value smaller than the reading current LU1 during the waiting process, the image-reading device 1 better suppresses a rise in temperature in the light source 31 than a device that maintains the current value of the light source 31 at the reading current LU1 during the waiting process.

More specifically, in a light source 31 that uses LEDs as light-emitting elements, the wavelength of light emitted from the light source 31 changes when the temperature increases. Thus, there are cases in which the intensity of light irradiated from the light source 31 drops due to its change in wavelength. This drop in light intensity reduces the quality of the image scanned from the sheet M. By suppressing a rise in temperature in the light source 31, the image-reading device 1 can prevent the light intensity of the light source 31 from dropping far enough to reduce the quality of the scanned image.

(2) During the waiting process of the first embodiment, the image-reading device 1 continues lighting the light source 31 of the first reading unit 30 with the inter-sheet current LU2. With the light source 31 employing LEDs as light-emitting elements, the time required for the wavelength of light emitted from the light source 31 to stabilize can be lengthy. If the light source 31 is turned off during a waiting process and subsequently relit to read a sheet of original M in the next reading process, the quality of the scanned sheet M may suffer if the wavelength of light has not yet stabilized. By keeping the light source 31 lit during the waiting process, the image-reading device 1 can reduce the time required to stabilize the wavelength of emitted light, thereby reducing the possibility of poorer quality in the scanned image.

Next, a second embodiment of the present invention will be described with reference to FIG. 6. The second embodiment differs from the first embodiment in that both the first reading unit 30 and second reading unit 40 of the reading unit 24 are used to read both surfaces of the sheet M. Details of the second embodiment that have already been described in the first embodiment will be omitted from the following description.

The operation for reading the front surface of the sheet M using the first reading unit 30 in the second embodiment is equivalent to that described in the first embodiment. In the second embodiment, the CPU 11 controls the second reading unit 40 to read the back surface of the sheet M in parallel with the operation for reading the front surface of the sheet M with the first reading unit 30. The calibration process performed for the second reading unit 40 is executed simultaneously with the calibration process for the first reading unit 30.

The reading process for reading the back surface of the sheet M also begins simultaneously with the reading process for the front surface. That is, when the leading edge of the sheet M in the conveying direction D1 reaches the first reading position P1, the CPU 11 begins the reading process with the first reading unit 30 and second reading unit 40. The CPU 11 turns the light source 31 on at the reading current LU1 set for the light source 31 and turns the light source 41 on at a reading current LU3 for the light source 41 (timing t3 in FIG. 6).

Figure 6:
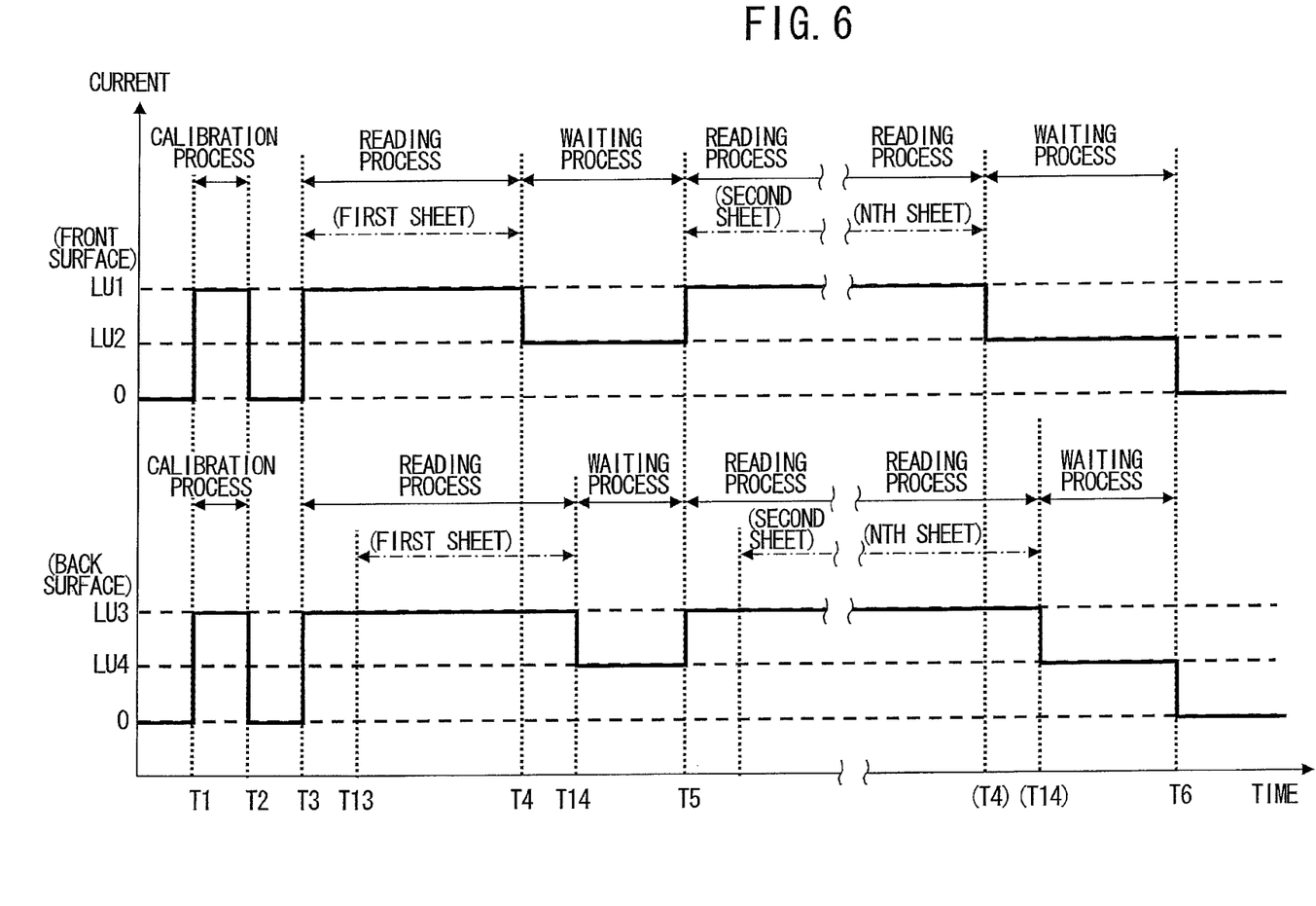
FIG. 6 is a timing chart showing changes in magnitude of electric current flowing to the light source during the lighting control process in a second embodiment of the present invention.

Immediately after lighting the light source 31, the CPU 11 begins reading the front surface of the sheet M with the first reading unit 30 (timing t3 in FIG. 6). The CPU 11 continues reading the front surface with the first reading unit 30 until the trailing edge of the sheet M reaches the first reading position P1 (timing t4 in FIG. 6), then ends the reading process with the first reading unit 30.

In the meantime, after lighting the light source 31 with the reading current LU1, the CPU 11 waits until the leading edge of the sheet M arrives at the second reading position P2. At this time, the CPU 11 begins reading the back surface of the sheet M with the second reading unit 40 (timing t13 in FIG. 6). The CPU 11 continues reading the back surface with the second reading unit 40 until the trailing edge of the sheet M reaches the second reading position P2 (timing t14 in FIG. 6), and subsequently ends the reading process with the second reading unit 40. Consequently, the period of the reading process for the back surface of the sheet M, indicated by the arrows connected by a solid line in FIG. 6, is longer than the period during which the second reading unit 40 is actually reading the back surface, indicated by the arrows connected by a chain line.

When reading the back surface of the sheet M, the CPU 11 executes a waiting process after each reading process. Since the second reading position P2 at which the second reading unit 40 reads the back surface of the sheet M is positioned on the conveying path 22 downstream of the first reading position P1 at which the first reading unit 30 reads the front surface of the sheet M, the waiting process for reading the back surface of the sheet M begins later than the waiting process for reading the front surface of the sheet M.

In the waiting process for reading the back surface of the sheet M, the CPU 11 powers the light source 41 with an inter-sheet current LU4, which is smaller than the reading current LU3. More specifically, the CPU 11 commands the control circuit 14 to change the current-value-determining signal outputted from the LED current generation unit 52 to a current-value-determining signal specifying a smaller current value than the reading current LU3, while maintaining the timing signal outputted from the light-emission-timing signal generation unit 54 at a signal for keeping the switching elements Q in the switching circuit 64 of the current regulating circuit 58 on.

If a subsequent sheet M is present, then after the leading edge of the subsequent sheet M has reached the first reading position P1, the CPU 11 simultaneously ends the waiting process for both the first and second reading units 30 and 40 and simultaneously resumes the reading processes for the same (timing t5 in FIG. 6). However, if a subsequent sheet M does not exist, the CPU 11 simultaneously ends the waiting process for both the first and second reading units 30 and 40, and then ends the lighting control process (timing t6 in FIG. 6).

In the second embodiment described above, the image-reading device 1 can suppress a rise in temperature in both light sources 31 and 41 of the first and second reading units 30 and 40, respectively, to avoid changes in the wavelength of light emitted from the light sources, and can reduce the time required for the wavelength of light emitted from the light sources 31 and 41 to stabilize upon resuming a reading process following a waiting process.

Next, a third embodiment of the present invention will be described with reference to FIG. 7. The third embodiment differs from the second embodiment in that the light source 31 of the first reading unit 30 is turned off during the waiting processes when reading the front surface of the sheet M using the first reading unit 30. Details of the third embodiment that have already been described in the first and second embodiments will be omitted from the following description.

Figure 7:
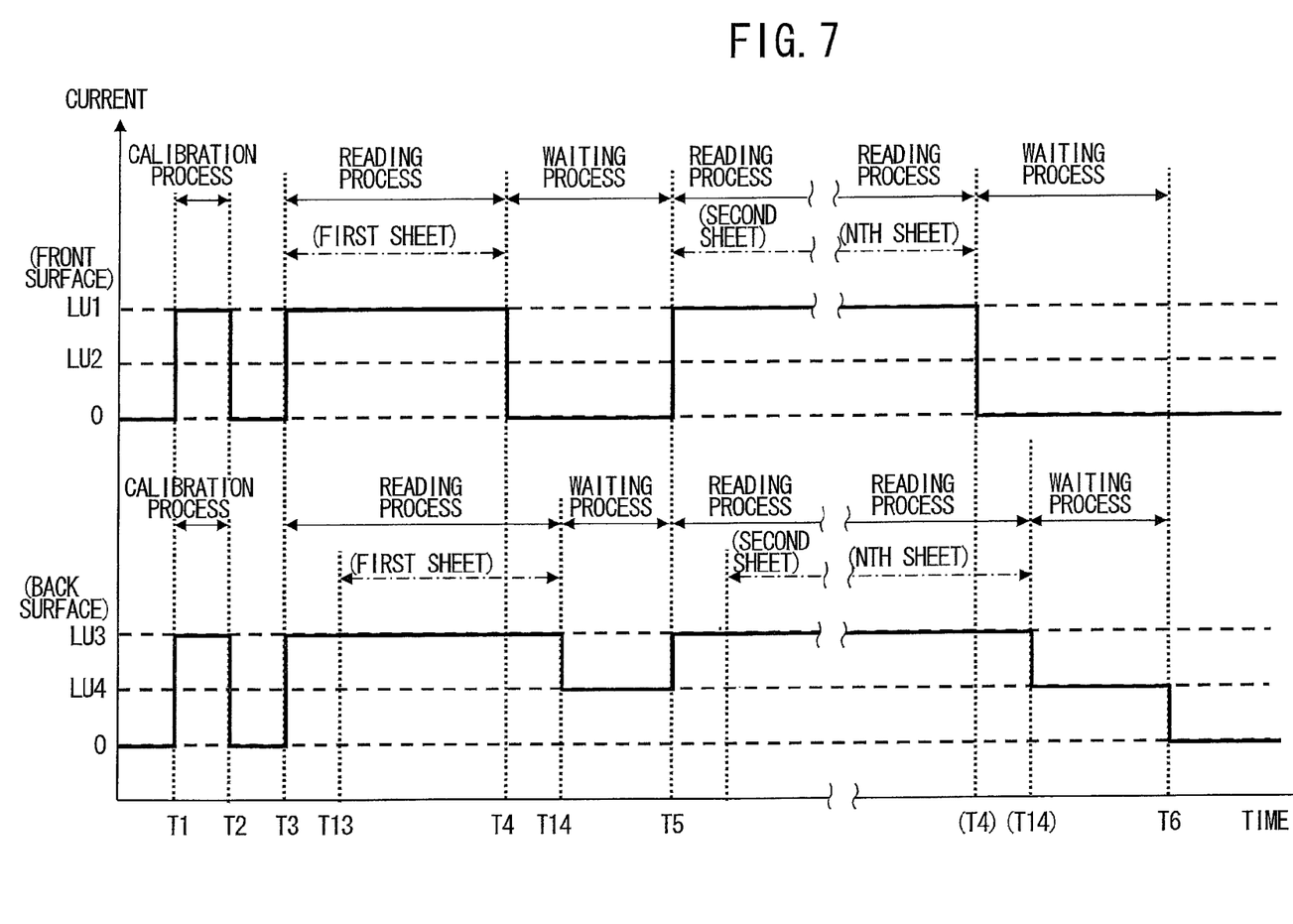
FIG. 7 is a timing chart showing changes in magnitude of electric current flowing to the light source during the lighting control process in a third embodiment of the present invention.

The image-reading device 1 according to the third embodiment includes a mode for reading one side surface of the sheet M, as described in the first embodiment, and a mode for reading both side surfaces of the sheet M, as shown in FIG. 7. The CPU 11 can switch between these modes when reading sheets of original M. The image-reading device 1 according to the third embodiment is configured to use the first reading unit 30 for reading the front surface of the sheet M in the single-sided reading mode. Accordingly, the light source 31 of the first reading unit 30 is used more frequently than the light source 41 of the second reading unit 40.

When reading both side surfaces of the sheet M in the third embodiment, the CPU 11 shuts off the light source 31 during the waiting process (timing t4 in FIG. 7). That is, the CPU 11 controls the control circuit 14 to change the timing signal outputted from the light-emission-timing signal generation unit 54 to a signal for switching off the switching elements Q in the switching circuit 64 of the current regulating circuit 56, without modifying the current-value-determining signal outputted from the LED current generation unit 52 to the current regulating circuit 56.

In the third embodiment, the image-reading device 1 can suppress a rise in temperature in the light source 41 used only when the image-reading device 1 reads both surfaces of the sheet M to prevent changes in the wavelength of light emitted from the light source 41, and can reduce the time required to stabilize the wavelength of light emitted by the light source 41 upon resuming a reading process following a waiting process.

In the third embodiment, the image-reading device 1 turns off the light source 31 during the waiting processes when reading both side surfaces of sheets M, since the light source 31 is used for both single-sided and double-sided reading processes. Hence, the light source 31 is used more frequently than the light source 41 of the second reading unit 40, which is only used in double-sided reading processes. Accordingly, the image-reading device 1 can slow deterioration of the light source 31 caused by overuse, enabling the light source 31 to have a longer lifespan than when the light source 31 is lighted continuously during the lighting control process.

Next, a fourth embodiment of the present invention will be described with reference to FIG. 8. The fourth embodiment differs from the second embodiment for reading the back surface of the sheet M with the second reading unit 40 in that the light source 41 of the second reading unit 40 is turned off during the waiting processes. Details of the fourth embodiment that have already been described in the first and second embodiments will be omitted from the following description.

Figure 8:
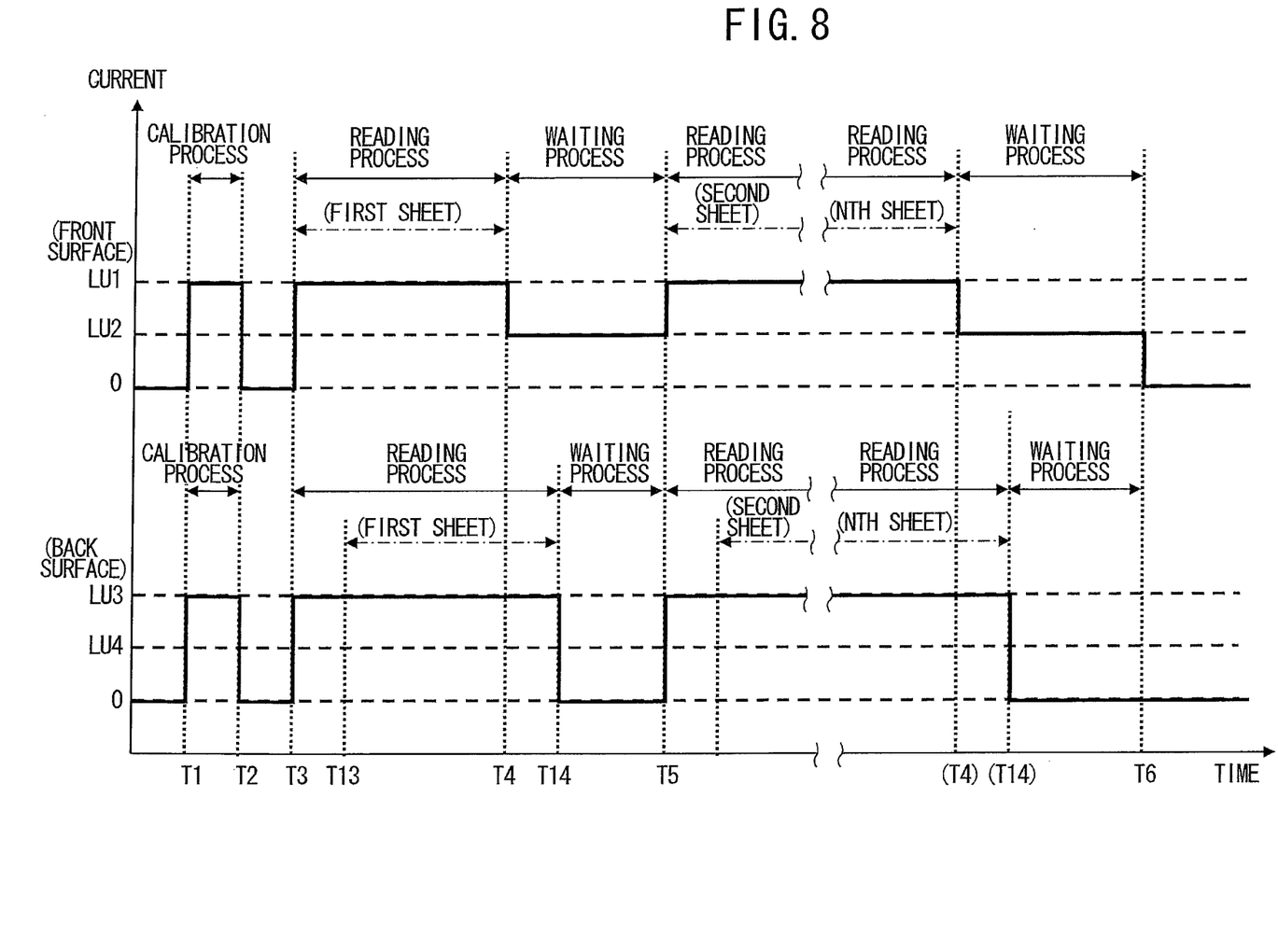
FIG. 8 is a timing chart showing changes in magnitude of electric current flowing to the light source during the lighting control process in a fourth embodiment of the present invention.

When reading both side surfaces of the sheets M in the fourth embodiment, the CPU 11 turns off the light source 41 during waiting processes (timing t14 in FIG. 8). Specifically, the CPU 11 transmits, to the control circuit 14, an instruction to change the timing signal outputted from the light-emission-timing signal generation unit 54 to a signal for switching off switching elements Q in the switching circuit 64 of the current regulating circuit 58, without modifying the current-value-determining signal outputted from the LED current generation unit 52 to the current regulating circuit 58.

If a subsequent sheet M is present, then after the leading edge of the subsequent sheet M arrives at the first reading position P1, the CPU 11 ends the waiting process for both the first and second reading units 30 and 40 and resumes the reading process (timing t5 in FIG. 8). In other words, the first reading position P1 serves as the reference position determining when the reading process for the first reading unit 30 begins and the reference position determining when the reading process for the second reading unit 40 begins. Hence, the reference position for the first reading unit 30 is equivalent to the reference position for the second reading unit 40.

At this time, the CPU 11 controls the light sources 31 and 41 to emit the light at the reading current LU1 and LU3, respectively. However, if a subsequent sheet M is not present, the CPU 11 ends the waiting process for both the first and second reading units 30 and 40 and ends the lighting control process (timing t6 in FIG. 8).

In the fourth embodiment described above, the image-reading device 1 can suppress changes in the wavelength of light emitted from the light source 31 due to rising temperatures in the same, and can shorten the time required for the wavelength of light emitted by the light source 31 to stabilize upon resuming a reading process following a waiting process.

In the fourth embodiment, the image-reading device 1 turns off the light source 41 of the second reading unit 40 during waiting processes, but begins the subsequent reading processes with the second reading unit 40 simultaneously with the first reading unit 30 in order to turn on the light source 41 before the second reading unit 40 actually begins reading the back surface of the sheet M. Hence, despite the light source 41 being turned off during the waiting process, the interval after the light source 41 is turned back on and until the second reading unit 40 begins reading the back surface of the sheet M allows for enough time to stabilize the wavelength of light emitted from the light source 41.

While the invention has been described in detail with reference to the first to fourth embodiments thereof, it would be apparent to those skilled in the art that various changes and modifications may be made therein without departing from the spirit of the invention.

(1) While the present invention is applied to the image-reading device 1 in the first to fourth embodiments described above, the present invention may be applied to another device, such as a multifunction peripheral possessing at least one of a printer function, copier function, facsimile function, or other function in addition to an image-reading function.

(2) In the first to fourth embodiments described above, the reference positions for both the first and second reading units 30 and 40 are set to the first reading position P1, but the present invention is not limited to this arrangement. For example, the reference position of the first reading unit 30 may be set to a position on the conveying path 22 between the detection position P3 and first reading position P1, while the reference position of the second reading unit 40 may be set to a position on the conveying path 22 between the detection position P3 and second reading position P2.

(3) The reference positions for the first and second reading units 30 and 40 need not be set to the same position, but may be set to different positions, provided that the reference positions fall between the detection position P3 and the first reading position P1 and second reading position P2, respectively.

(4) The reading current LU1 for the first reading unit 30 and the reading current LU3 for the second reading unit 40 may be set to the same value or different values. Similarly, the inter-sheet current LU2 for the first reading unit 30 and the inter-sheet current LU4 for the second reading unit 40 may be set to the same or different values.

(5) While there is no particular restriction in values for the inter-sheet current LU2 (LU4) and reading current LU1 (LU3), provided that the inter-sheet current LU2 (LU4) is lower than the reading current LU1 (LU3), the inter-sheet current LU2 (LU4) may be set to approximately half the value of the reading current LU1 (LU3).

(6) While the light intensity of light sources is described based on the magnitude of current flowing to the light sources in the preferred embodiments, light intensity may be referenced based on a value obtained from the product of the magnitude of current flowing to the light source and the length of time that current of this magnitude flows to the light source, for example.

What is claimed is:

1. An image reading device comprising:
   a conveying unit configured to sequentially convey a plurality of sheets along a conveying path such that a gap is formed between successive two sheets of the plurality of sheets, the conveying path having a first reading position, the successive two sheets including a preceding sheet and a subsequent sheet;
   a reading unit configured to read a sheet conveyed by the conveying unit at the first reading position, the reading unit including:
      a light source configured to emit a light toward the first reading position; and
      a light-receiving unit configured to receive a reflected light emitted by the light source and reflected from the first reading position; and
      a control unit configured to control the light source to continue to emit a light during a period of time from when the reading unit begins reading a first sheet of the plurality of sheets to when the reading unit has read a last sheet of the plurality of sheets by:
   controlling the light source to emit the light at a first light intensity for a sheet that has reached the first reading position, the light-receiving unit receiving a reflected light that is reflected by the sheet present at the first reading position; and
   controlling the light source to emit the light at a second light intensity lower than the first light intensity during a period of time from when the reading unit has read the preceding sheet to when the reading unit begins reading the subsequent sheet,
   wherein the control unit controls the reading unit to begin reading the preceding sheet when the preceding sheet reaches a first reference position and to continue to read the preceding sheet while the preceding sheet is passing the first reading position, the first reference position being the first reading position;
   wherein, when the preceding sheet has passed the first reading position, the control unit controls the reading unit to halt reading the preceding sheet and to control the light source to emit the light at the second light intensity until the subsequent sheet reaches the first reference position,
   wherein the reading unit includes:
      a first reading unit disposed on the conveying path and configured to read one face of a sheet at the first reading position when the sheet reaches the first reading position; and
      a second reading unit disposed on the conveying path and configured to read another surface of the sheet at a second reading position when the sheet reaches the second reading position, the second reading position being downstream of the first reading position in the conveying path;
   wherein the control unit is configured to control the first reading unit and the second reading unit to read the one surface and the another surface, respectively by controlling the light source of at least one of the first reading unit and the second reading unit to emit the light at the first light intensity, the light-receiving unit of the at least one of the first reading unit and the second reading unit receiving the reflected light;
   wherein the control unit controls the at least one of the first reading unit and the second reading unit to control the light source of the at least one of the first reading unit and the second reading unit to continue to emit a light during a period of time from when the reading unit begins reading the first sheet of the plurality of sheets to when the reading unit has read the last sheet of the plurality of sheets by:
   controlling the light source to emit the light at the first light intensity for the sheet that has reached a reading position, the reading position being the first reading position when the at least one of the first reading unit and the second reading unit is the first reading unit, the reading position being the second reading position when the at least one of the first reading unit and the second reading unit is the second reading unit; and
   controlling the light source to emit the light at the second light intensity during a period of time from when the preceding sheet has been read to when the subsequent sheet reaches the first reference position.

2. The image reading device according to claim 1, wherein the at least one of the first reading unit and the second reading unit is the first reading unit;
   wherein the control unit controls:
      the second reading unit to read the another surface of the sheet at the second reading position by controlling the light source of the second reading unit to emit the light at a third light intensity, the light-receiving unit of the second reading unit receiving the reflected light that is reflected by the second reading position; and
      the light source of the at least one of the first reading unit and the second reading unit emitting the light at a fourth light intensity lower than the third light intensity during a period of time from when the preceding sheet has been read to when the subsequent sheet reaches a second reference position, the second reference position being the second reading position.

3. The image reading device according to claim 1, wherein the control unit is further configured to select one of a single-sided reading mode and a both-sided reading mode,
   wherein, if the single-sided reading mode is selected, the control unit controls the first reading unit to read the one surface and controls the second reading unit to fail to read the another surface;
   wherein, if the both-sided reading mode is selected, the control unit controls both the first reading unit and the second reading unit to read the one surface and the another surface, respectively;

wherein, if the both-sided reading mode is selected, the control unit controls the first reading unit to halt reading the preceding sheet when the preceding sheet has passed the first reading position and to turn the light source of the first reading unit off during a period of time from when the preceding sheet has passed the first reading position to when the subsequent sheet reaches the first reference position;

wherein, if the both-sided reading mode is selected, the control unit controls the second reading unit to continue to emit a light during a period of time from when the second reading unit begins reading the first sheet of the plurality of sheets to when the second reading unit has read the last sheet of the plurality of sheets by:

controlling the light source of the second reading unit to emit the light at the first light intensity for the sheet that has reached the second reading position; and halting reading the preceding sheet when the preceding sheet has passed the second reading position and controlling the light source of the second reading unit to emit the light at the second light intensity during a period of time from when the preceding sheet has passed the second reading position to when the subsequent sheet reaches a second reference position, the second reference position being the second reading position.

4. The image reading device according to claim 1, wherein the control unit controls the first reading unit to continue to emit a light during a period of time from when the first reading unit begins reading the first sheet of the plurality of sheets to when the first reading unit has read the last sheet of the plurality of sheets by:

controlling the light source of the first reading unit to emit the light at the first light intensity for the sheet that has reached the first reading position; and halting reading the preceding sheet when the preceding sheet has passed the first reading position and controlling the light source of the first reading unit to emit the light at the second light intensity during a period of time from when the preceding sheet has passed the first reading position to when the subsequent sheet reaches the first reference position;

wherein the control unit controls the second reading unit to halt reading the preceding sheet when the preceding sheet has passed the second reading position and to turn the light source of the second reading unit off during a period of time from when the preceding sheet has passed the second reading position to when the subsequent sheet reaches the first reference position.

5. The image reading device according to claim 1, further comprising a detecting unit disposed on the conveying path and configured to detect whether or not a sheet conveyed by the conveying unit reaches a detecting position upstream of the first reading position in the conveying path;

wherein the control unit transmits an instruction to read the sheet to the reading unit when the detecting unit detects the sheet reaching the detecting position.

6. An image reading device comprising:

a conveying unit configured to sequentially convey a plurality of sheets along a conveying path such that a gap is formed between successive two sheets of the plurality of sheets, the conveying path having a first reading position and a second reading position downstream of the first reading position, the successive two sheets including a preceding sheet and a subsequent sheet;

a first reading unit configured to read one surface of a sheet conveyed by the conveying unit at the first reading position, the first reading unit including:
 a first light source configured to emit a light toward the first reading position; and
 a first light-receiving unit configured to receive a reflected light emitted by the first light source and reflected from the first reading position;

a second reading unit configured to read another surface of a sheet conveyed by the conveying unit at the second reading position, the second reading unit including:
 a second light source configured to emit a light toward the second reading position; and
 a second light-receiving unit configured to receive a reflected light emitted by the second light source and reflected from the first reading position; and a control unit configured to:
 control the first reading unit to read one surface of the preceding sheet passing through the first reading position by controlling the first light source to emit a light at a first read intensity and controlling the first light-receiving unit to receive a reflected light emitted by the first light source and reflected from the one surface of the preceding sheet;
 control the second reading unit to read another surface of the preceding sheet passing through the second reading position by controlling the second light source to emit a light at a second read intensity and controlling the second light-receiving unit to receive a reflected light emitted by the second light source and reflected from the another surface of the preceding sheet;
 control, when the preceding sheet has passed the first reading position, the first reading unit to halt reading the one surface of the preceding sheet and control the first light source to emit the light at a first inter-sheet intensity lower than the first read intensity;
 control, when the preceding sheet has passed the second reading position, the second reading unit to halt reading the another surface of the preceding sheet and control the second light source to emit a light at a second inter-sheet intensity lower than the second read intensity; and
 control, when the subsequent sheet reaches the first reading position, the first reading unit and the second reading unit to read one surface and another surface of the subsequent sheet by controlling the first light source to emit a light at the first read intensity and controlling the second light source to emit a light at the second read intensity.

* * * * *